United States Patent [19]

Fosbøl et al.

[11] Patent Number: 5,747,087
[45] Date of Patent: May 5, 1998

[54] METHOD FOR THE PRODUCTION OF VEGETABLE SNACKS

[75] Inventors: Peder Fosbøl, Lyngby; Birgitte Korremann, Vanløse; Henrik Ullum, Karlslunde, all of Denmark

[73] Assignee: Snacko A/S, Ballerup, Denmark

[21] Appl. No.: 754,862

[22] Filed: Nov. 22, 1996

Related U.S. Application Data

[63] Continuation of Ser. No. 318,659, PCT/DK93/00261, filed Aug. 12, 1993, abandoned.

[51] Int. Cl.⁶ ..................................................... A23L 1/216
[52] U.S. Cl. ........................................... 426/242; 426/637
[58] Field of Search ................................. 426/241, 242, 426/243, 637; 99/451; 34/266

[56] References Cited

U.S. PATENT DOCUMENTS

| | | | |
|---|---|---|---|
| 3,502,479 | 3/1970 | Singer et al. | 426/242 |
| 3,646,878 | 3/1972 | Keller | 426/243 X |
| 4,749,579 | 6/1988 | Haydock et al. | 426/242 |
| 4,800,090 | 1/1989 | August | 426/249 |
| 5,049,711 | 9/1991 | August | 219/10.55 |
| 5,470,600 | 11/1995 | Petelle | 426/237 |
| 5,560,287 | 10/1996 | Petelle | 99/451 |

FOREIGN PATENT DOCUMENTS

| | | | |
|---|---|---|---|
| 2921936 | 12/1980 | Germany | 426/243 |
| 351521 | 10/1972 | U.S.S.R. | 426/243 |
| 533100 | 6/1978 | U.S.S.R. | 426/243 |
| 225994 | 10/1992 | United Kingdom . | |

*Primary Examiner*—Arthur L. Corbin
*Attorney, Agent, or Firm*—Antonelli, Terry, Stout, & Kraus, LLP

[57] ABSTRACT

Vegetable snacks without fat are produced by placing sliced objects such as potato slices (3) on a net belt (1) in a single layer and by first carrying them through a pre-drying zone (5) and then a treatment zone (6) where the potato slices are puffed. The puffed potato slices (3') are then carried to a post-drying zone (7) and conveyed through same by a belt (2) whereafter the finished potato chips (3") are packed. In all heating zones (5,6,7) there may be used heating elements (4) treating the potato slices with infrared heat radiation, if desired, by two-sided treatment by further heating elements or reflectors (10).

15 Claims, 1 Drawing Sheet

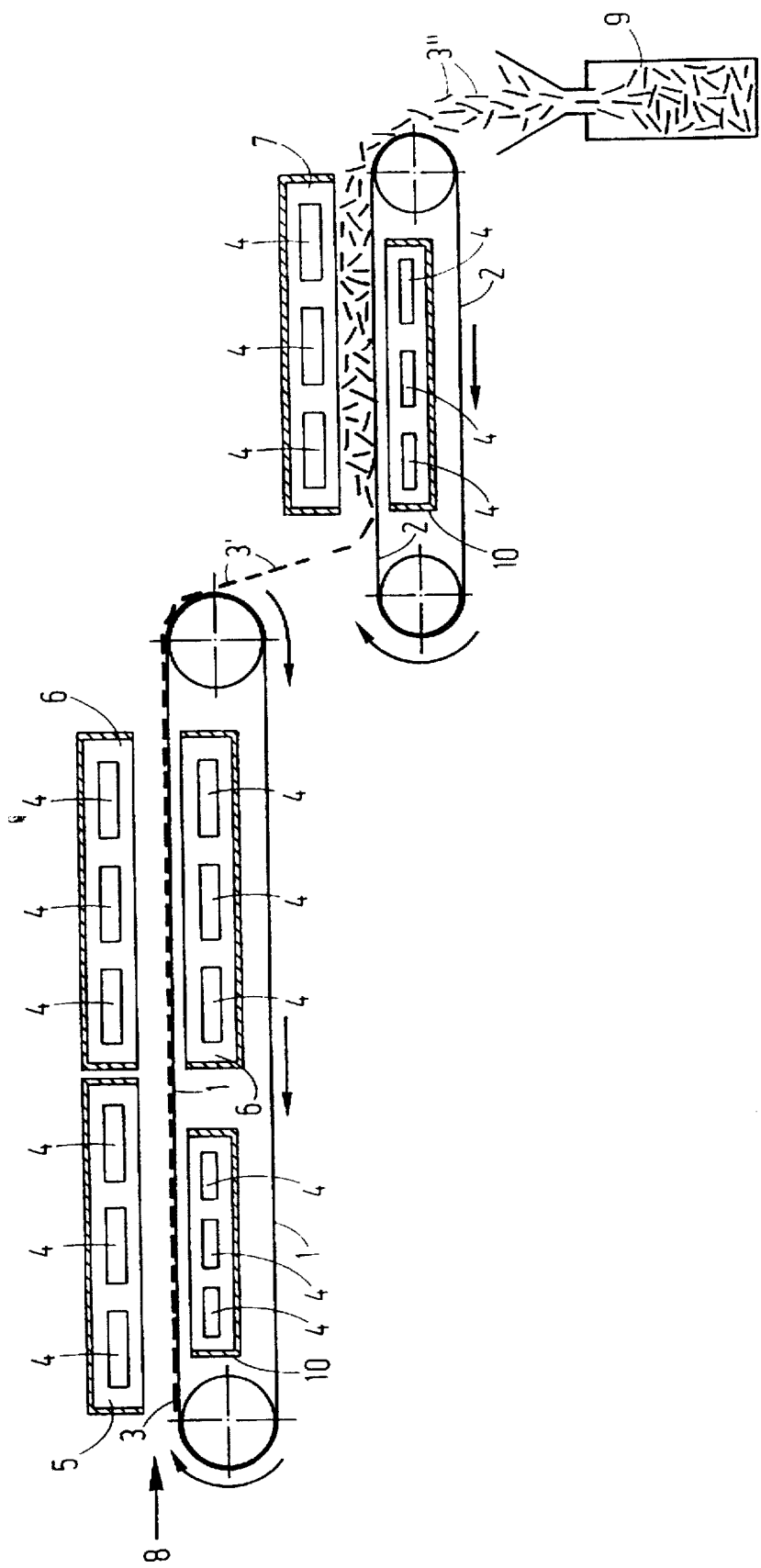

5,747,087

1

METHOD FOR THE PRODUCTION OF VEGETABLE SNACKS

This is a continuation of application Ser. No. 08/318,659, filed May 18, 1997 abandoned, which is a 35 USC 371 of PCT/DK 93/0026, Apr. 24, 1995, now abandoned, filed Aug. 12, 1993.

BACKGROUND OF THE INVENTION

The invention relates to a method for the production of vegetable snacks without using or adding fats, and an apparatus for carrying out the method.

For several years it has been known to produce vegetable snacks, ie. crisp and crunchy snacks of vegetable material, such as potatos, apples, bananas and similer vegetables or root vegetables. The vegetable material is sliced or formed into slices which then undergo a treatment reducing the water content so much that a preservation is obtained while at the same time obtaining a crisp, tasty and healthy product with a pleasant appearance. The water content must be reduced so that the dry-matter content is above 85% and therefore the product must be kept in air-tight bags until it is consumed if it is not to loose its crispness and taste. Reduction of the water content may take place by vacuum drying or freeze drying which, however, are comparatively costly processes and which will not always provide a product with a sufficiently pleasant appearance.

GB patent application no. 2,254,994 describes a method and an apparatus for producing potato chips without fat wherein the chips are first dried to have a moisture content below 30% whereafter they are dried at 140°–220° C. to obtain a final, suitable residual moisture, crispness and a desired appearance. The drying is made by hot air while effectively stirring, which is a difficult process to control and moreover energywise a very expensive way of carrying out the drying process. Furthermore, this method will often necessitate readjustment of the moisture content by adding water prior to the final drying which increases the energy consumption.

Others therefore apply a heat treatment for producing vegetable chips without adding fat whereby it is possible by a suitable heat treatment to obtain snacks with the desired properties regarding appearance, crispness, taste and structure. U.S. Pat. No. 4,800,090 and U.S. Pat. No. 5,049,711 describe a method and an apparatus for producing potato chips by applying a heat treatment without using or adding fats, the heat treatment process comprising a first step of heat treatment with infrared radiation of the potato slices, then a microwave treatment of the pre-dried potato slices and, finally, a post-drying process again with infrared radiation in order to obtain a desired browning and a desired dry-matter content in the finished product. Finally, the finished product is radiated prior to packaging with ultraviolet light to ensure preservation.

Application of microwave energy, however, is technically complicated and costly. Microwave ovens for continuous use require compliance with many safety measures which are to prevent the radiation from getting outside the oven. Moreover, it is generally known that it is difficult to obtain an even and uniform heating with microwave radiation at least not without a number of further technical facilities which will distribute the field evenly within the oven. The process also calls for the application of a special conveyor belt through the microwave oven which means that the potato snacks are to be conveyed from one belt by the pre-drying to the next belt by the microwave treatment and then to a new belt, the third belt, by the post-drying. This will provide an inappropriate and complicated apparatus and will probably require synchronisation of the first two belts since the pre-drying and the microwave treatment will require that the potato slices form a single layer on the belt. There are therefore a number of drawbacks in the known process and the known apparatus therefor which drawbacks are mainly caused by the application of microwave energy for the central treatment of the potato slices in that this treatment is to give the potato slices the desired properties.

SUMMARY OF THE INVENTION

By the process of the present invention the use of microwave treatment and other complicated treatment forms for the central treatment of the vegetable objects, namely the heat treatment in the treatment zone itself where the puffing takes place, is completely avoided. It has surprisingly proved possible to provide the vegetable objects with the required energy for the puffing by infrared heat radiation. In the pre-drying zone the objects must be dried in a controlled manner so as to form on the surface of each object a thin, relatively uniform shell. By the puffing in the treatment zone there is then supplied so much heat that a boiling of the water which is still bound in the inner tissue of the object occurs. The structure is thereby puffed into a loose, crisp surface resulting in a product with the desired properties. The post-drying is to ensure that the finished product has a water activity which is low enough to preserve the product without adding preservatives or without any further finishing treatment. The product is then packed in suitable packages and will keep for a long period of time.

The pre-drying and the post-drying can be made in a known manner, for example by airdrying or by applying infrared radiation. By applying infrared radiation for the pre-drying as well as the post-drying, a shorter processing time is achieved which permits the application of shorter conveyor belts and shorter drying zones resulting in a smaller and cheaper apparatus.

If the vegetable snacks to be produced are potato chips, it is advantageous to maintain the temperature in the pre-drying zone at up to 350° C., preferably about 200° C., to achieve the required temperature in the treatment zone by infrared radiation, and to vary the temperature in the post-drying zone between 250° C. and 100° C. It has proved possible to produce potato chips with the desired properties in this manner without complicated controlling processes. If the temperature in the individual zones is as stated, and the conveyor belts and the individual zones have suitable lengths, then the potato chips will get suitable treatment periods in the individual zones. With the preferred temperatures as set forth above, the pre-drying can take place in about 1–5 min., the treatment itself, i.e., the puffing, in about 0.5–3 min., and the post-drying in about 4–15 min., so that the total processing time by a continuous production can be kept under 10 minutes.

The method is simplified in that it has proved possible to integrate the pre-drying zone and the treatment zone into one zone with an increasing temperature in the travelling direction until the puffing has been achieved as desired. This will reduce the processing time which also means that the production apparatus can be reduced in size and thus also costwise. By processing slices of equal thickness of 0.5–3 mm, preferably 0.9–1.2 mm, there is obtained a highly uniform end product. The more uniform the thickness of the slices, the more uniform will the final quality be.

Depending on the desired structure in the end product, it is further possible to maintain the temperature as set forth above and, during a pre-treatment immediately before the pre-drying, the product may either be boiled or steam-treated by carrying the belt with the slices arranged individually thereon through a bath of boiling water or through a steam chamber. The boiling time will be between 0.5 and 5 min., depending on slice thickness, potato thickness, time of crop etc.

By adding spices, e.g., solium chloride, it is possible to obtain a suitable spicing of the end product. The spicing may be effected by boiling the slices in a solution of spices, for example 2% sodium chloride solution, or by spraying salt and/or spices directly onto the slices on the belt.

If raw slices are directly used and the temperatures maintained as described above, salt and any spices may be sprayed directly onto the slices on the belt immediately prior to the heat treatment.

The invention also relates to an apparatus for the production of vegetable chips by application of the method according to the invention. This processing apparatus makes it possible, continuously and at a minimum energy consumption, to produce vegetable snacks without using fats, for example potato chips. If the apparatus is designed with infrared heat radiation in the pre-drying zone as well as the post-drying zone in addition to the treatment zone, there is obtained an apparatus wherein it is possible in a simple manner to adjust the energy supply and thus the temperature in the individual zones irrespective of these zones being physically separated or being integrated.

BRIEF DESCRIPTION OF THE DRAWING

The invention will now be described with reference to the drawing showing a section through an apparatus according to the invention and with reference to the below example.

DETAILED DESCRIPTION OF THE PREFERRED EMBODIMENTS

The apparatus shown in the drawing comprises two conveyor belts 1, 2, where the first conveyor belt 1 is a so-called net belt. By the belts there are arranged a number of heating units 5, 6, 7, where the heating unit 5 is the pre-drying zone, the heating units 6 form the treatment zone and the heating unit 7 is the post-drying zone. Under the heating unit 5 in the pre-drying zone there may be arranged a reflector or a heating unit 10. The heat treatment units 6 enclose the net belt so that the puffing takes place by heat treatment from both sides. All the heating units are shown with infrared heating units 4. Slices of vegetable material 3 arranged individually on the belt 1, for example in a width of up to several metres, in order to achieve large-scale production capacity are introduced at the feeding point 8. Following pre-drying and puffing the now almost finished snacks 3' are transferred to the post-drying belt 2 which has a substantially lower travelling speed than the first belt 1 such that the snacks will lie on the belt in a thicker layer and at random. The reflector or heating unit 10 under the belt will permit post-drying from both sides. The finished snacks 3" are then transferred after cooling, if so desired, directly to the packing 9 in the form of suitable packages. The drying can therefore take place two-sidedly either by applying heating units 5, 6, 7, 10 on either side of the belts 1, 2 or by heating units on one side of the belt and reflectors on the other side of the belt or by a combination thereof. It has also proved possible, however, to produce snacks of the mentioned kind by one-sided drying.

The pre-drying with the heating unit 5 may take place by airdrying or as shown by direct infrared radiation. If airdrying is applied, this will be at an air temperature of up to 350° C. At a temperature of for example 200° C., the drying period will be about 4 min. by a slice thickness of 1 mm. In case of infrared radiation, the comparative drying period will be about 1–3 min. depending on whether the potato slices are raw or pre-boiled.

In the puffing zone 6 there is applied a treatment period of 0.5–3.0 min. by infrared radiation. The processing time in the pre-drying zone 5 and the treatment zone 6 is determined by the speed of the belt 1 and the length of the zones.

In the post-drying zone 7 the drying may take place by hot air at a temperature of 100°–250° C. for 4–15 min. or as shown by infrared heat radiation. Incidentally, by some types of vegetable objects it has proved advantageous if the post-drying zone has a higher temperature at the beginning of the zone than at the end of the zone. Also here the treatment period is determined by the speed of the belt 2 and the length of the heating zone. To ensure uniform post-drying there may be arranged means immediately above the belt which stir the objects situated on the belt.

There may be used fresh, raw potatoes, which have been washed and sliced with or without peel, or preboiled potato slices. In case of pre-treatment the belt 1 will usually be extended so that the raw slices are placed on the conveyor belt directly from the cutting machine and then carried through a boiling section where the slices are boiled either by carrying them through a bath of boiling water or a boiling spice solution or by carrying them through a steam chamber.

EXAMPLE 100 kg fresh unpeeled potatoes are washed and cut into 1 mm thick slices. Directly from the cutting machine they are individually arranged on a net belt carrying the potato slices through a boiling zone before they are carried through an apparatus which in principle is designed as shown in the drawing.

The end product is 20 kg potato chips produced according to the following process:

| Treatment | Time min. | Temp. °C. | % dry matter start | % dry matter end | Product weight kg |
|---|---|---|---|---|---|
| Raw mat. | | | | | 100 |
| Preboiling | 2 | 100 | 17–21 | 17–25 | 80 |
| Predrying | 4 | 200 | 17–25 | 35–45 | 45 |
| Puffing IR | 1 | — | 35–45 | 62–78 | 30 |
| Postdrying | 10 | 225/120 | 62–78 | 95–100 | 20 |

The preboiling took place in a 2% NaCl solution.

The apparatus described above is only to be considered as one example of how the method according to the invention may be applied industrially, and the mentioned example is also just one example of how fat-free vegetable snacks in the form of potato chips may be produced according to the invention. It is obvious to a person skilled in the art that the invention may be applied in numerous different ways within the scope defined by the following patent claims. It is also obvious to a person skilled in the art that the method and the apparatus according to the invention may be used in connection with the production of vegetable snacks of almost any kind of vegetables or root vegetables, including potatos, carrots, onions, apples, leeks, bananas, beets, kiwi fruits etc., all without using fats.

We claim:

1. Method for producing vegetable snacks without using fats by heat treatment in a pre-drying zone, a treatment zone and a post-drying zone, comprising:

providing sliced vegetable objects of substantially equal thickness on a conveyor belt in a single layer;

conveying the objects through the pre-drying zone, and, while in the pre-drying zone, thermally treating the objects at a temperature which is high enough and a period of time which is long enough to form a thin shell on the surface of the object;

conveying the objects from the pre-drying zone and through the treatment zone and, while in the treatment zone, treating the objects on both sides with infrared heat radiation at a higher temperature than in the pre-drying zone and for so long that puffing of the objects is achieved; and conveying the objects from the treatment zone and through the post-drying zone and, while in the post-drying zone, further thermally treating the objects at a temperature which is lower than that of the pre-drying zone until the objects reach a dry-matter content above 85%.

2. Method according to claim 1, wherein the pre-drying zone and the treatment zone are integrated.

3. Method according to claim 1, wherein the vegetable objects are raw potato slices of substantially equal thickness which are fed to the pre-drying zone directly from a cutting machine;

wherein the temperature in the pre-drying zone is maintained at up to 350° C., and the temperature in the post-drying zone is varied between 250° C. and 100° C.; wherein the potato slices are conveyed on a conveyor belt so that the period of time within which the potato slices are in the individual zones will depend on the extension of the zones.

4. Method according to claim 3, wherein the pre-drying zone and the treatment zone are integrated.

5. Method according to claim 3, wherein the slices have a thickness of 0.5–3 mm.

6. Method according to claim 3, wherein the temperature in the pre-drying zone is maintained at about 200° C.

7. Method according to claim 3, wherein the slices have a thickness of 0.9 to 1.2 mm.

8. Method according to claim 3, wherein the steps of thermally treating the objects in the pre-drying zone and thermally treating the objects in the post-drying zone are conducted by air drying.

9. Method according to claim 1, wherein the vegetable objects are potato slices of substantially equal thickness and which, prior to being fed to the pre-drying zone, have been pre-treated by boiling or blanching at a temperature of approx. 100° C.;

wherein the temperature in the pre-drying zone is maintained at up to 350° C., and the temperature in the post-drying zone is varied between 250° C. and 100° C.; and wherein the potato slices are conveyed on a conveyor belt so that the period of time within which the potato slices are in the individual zones will depend on the extension of the zones.

10. Method according to claim 9, wherein the potato slices have been pre-treated by addition of spices.

11. Method according to claim 10, wherein the spices comprise sodium chloride.

12. Method according to claim 9, wherein the temperature in the pre-drying zone is maintained at about 200° C.

13. Method according to claim 9, wherein the steps of thermally treating the objects in the pre-drying zone and thermally treating the objects in the post-drying zone are conducted by air drying.

14. Method according to claim 1, wherein, while in the post-drying zone, the objects are further thermally treated at a temperature which is lower than that of the pre-drying zone until the objects reach a dry-matter content above 90%.

15. Method according to claim 1, wherein the steps of thermally treating the objects in the pre-drying zone and thermally treating the objects in the post-drying zone are conducted by air drying.

* * * * *